(12) United States Patent
Johnston et al.

(10) Patent No.: US 12,271,353 B2
(45) Date of Patent: *Apr. 8, 2025

(54) HYBRID DATA INTEGRATION PLATFORM

(71) Applicant: Bytedance Inc., Wilmington, DE (US)

(72) Inventors: David Alan Johnston, Portola Valley, CA (US); Andrew James, Los Altos, CA (US); Pradhee Tandon, Chicago, IL (US); Sivaramakrishnan Natarajan, Chicago, IL (US)

(73) Assignee: Bytedance Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,606

(22) Filed: Jun. 29, 2022

(65) Prior Publication Data

US 2022/0405255 A1    Dec. 22, 2022

Related U.S. Application Data

(63) Continuation of application No. 16/913,035, filed on Jun. 26, 2020, now Pat. No. 11,392,564, which is a (Continued)

(51) Int. Cl.
*G06F 16/215* (2019.01)
*G06F 3/0481* (2022.01)
(Continued)

(52) U.S. Cl.
CPC .......... *G06F 16/215* (2019.01); *G06F 3/0481* (2013.01); *G06F 16/285* (2019.01); *G06F 16/951* (2019.01)

(58) Field of Classification Search
CPC .... G06F 16/215; G06F 16/285; G06F 16/951; G06F 3/0481
See application file for complete search history.

(56) References Cited

U.S. PATENT DOCUMENTS 8,166,048 B2 * 4/2012 Wong ..................... G06Q 30/02
707/769
9,558,092 B2    1/2017 Zunuino et al.
(Continued)

OTHER PUBLICATIONS

U.S. Appl. No. 16/913,035, filed Jun. 26, 2020, U.S. Pat. No. 11,392,564, Issued.
(Continued)

*Primary Examiner* — Tarek Chbouki
(74) *Attorney, Agent, or Firm* — Alston & Bird LLP

(57) ABSTRACT

In general, embodiments of the present invention provide systems and computer readable media for implementing a single data integration platform that supports multiple data access interfaces to a single corpus of stored dynamic data collected from multiple data sources. In embodiments, the data integration platform includes a record tables layer that stores a group of data records and supports a CRUD interface for accessing the data records; a resolution mapping layer that stores a set of entities generated by a many-to-one mapping of data records to entities using entity resolution; and an entities layer that stores resolved entities which may be accessed via either a search interface based on search criteria or a hybrid search interface that supports "get via record id" queries.

16 Claims, 6 Drawing Sheets

Related U.S. Application Data continuation of application No. 15/192,439, filed on Jun. 24, 2016, now Pat. No. 10,733,157.

(60) Provisional application No. 62/185,364, filed on Jun. 26, 2015.

(51) Int. Cl.
*G06F 16/28* (2019.01)
*G06F 16/951* (2019.01)

(56) References Cited

U.S. PATENT DOCUMENTS

| | | | |
|---|---|---|---|
| 2002/0087613 A1* | 7/2002 | Harif | G06Q 30/02 709/201 |
| 2003/0115080 A1 | 6/2003 | Kasravi et al. | |
| 2005/0160104 A1 | 7/2005 | Meera et al. | |
| 2006/0190716 A1 | 8/2006 | Miller | |
| 2006/0191020 A1 | 8/2006 | Miller | |
| 2007/0100985 A1 | 5/2007 | Kirkwood et al. | |
| 2007/0214179 A1* | 9/2007 | Hoang | G06F 16/2428 |
| 2008/0249981 A1 | 10/2008 | Norring et al. | |
| 2009/0144319 A1 | 6/2009 | Panwar et al. | |
| 2010/0332829 A1 | 12/2010 | Baroffio | |
| 2011/0016091 A1 | 1/2011 | Prahlad et al. | |
| 2011/0161284 A1* | 6/2011 | Tewari | G06F 16/2365 707/694 |
| 2011/0231224 A1* | 9/2011 | Winters | G06Q 30/06 705/7.29 |
| 2012/0095862 A1* | 4/2012 | Schiff | G06Q 30/06 705/26.7 |
| 2012/0303481 A1 | 11/2012 | LouisN'jai | |
| 2013/0036311 A1* | 2/2013 | Akyol | H04L 63/08 713/189 |
| 2013/0159449 A1 | 6/2013 | Taylor et al. | |
| 2014/0012780 A1* | 1/2014 | Sanders | G06Q 40/04 705/36 R |
| 2014/0180826 A1* | 6/2014 | Boal | G06Q 30/0269 705/14.66 |
| 2014/0222966 A1 | 8/2014 | Marins et al. | |
| 2014/0279299 A1* | 9/2014 | Erenrich | G06Q 40/02 705/30 |
| 2014/0358932 A1* | 12/2014 | Brown | G06F 16/24532 707/741 |
| 2015/0073929 A1* | 3/2015 | Psota | G06Q 30/0605 705/26.2 |
| 2016/0012151 A1* | 1/2016 | Muchinsky | G06F 16/25 707/748 |
| 2016/0154830 A1 | 6/2016 | Papotti et al. | |
| 2016/0196331 A1* | 7/2016 | Jonas | G06F 16/245 707/603 |
| 2016/0350091 A1 | 12/2016 | Khot et al. | |

OTHER PUBLICATIONS

U.S. Appl. No. 15/192,439, filed Jun. 24, 2016, U.S. Pat. No. 10,733,157, Issued.

* cited by examiner

HYBRID DATA INTEGRATION PLATFORM

CROSS REFERENCE TO RELATED APPLICATION

This application is a continuation of U.S. patent application Ser. No. 16/913,035 titled "Hybrid Data Integration Platform," filed Jun. 26, 2020, which is a continuation of U.S. patent application Ser. No. 15/192,439 titled "Hybrid Data Integration Platform," filed Jun. 24, 2016 (now U.S. Pat. No. 10,733,157), which claims to benefit of U.S. Provisional Patent Application No. 62/185,364, titled "Hybrid Data Integration Platform," filed Jun. 26, 2015, the contents of each of which are incorporated by reference herein in their entirety.

FIELD

Embodiments of the invention relate, generally, to a hybrid data integration platform supporting multiple types of data access interfaces.

BACKGROUND

Different types of data access clients typically will have different data access needs. For example, clients who primarily are data consumers may need an interface to access resolved data entities generated by a data integration system, each entity describing the highest quality data having the maximum breadth, depth, and accuracy available, while clients who primarily are data creators may need the control over their data provided by accessing an interface supporting CRUD (creating, reading, updating, and deleting) semantics applied to the data records they create.

Current systems for supporting multiple types of data access interfaces exhibit a plurality of problems that make the systems insufficient, ineffective and/or the like. Through applied effort, ingenuity, and innovation, solutions to improve such systems have been realized and are described in connection with embodiments of the present invention.

SUMMARY

In general, embodiments of the present invention provide herein systems and computer readable media for implementing a single data integration platform that supports multiple data access interfaces to a single corpus of stored dynamic data collected from multiple data sources. In embodiments, the data integration platform includes a record tables layer that stores a group of data records and supports a CRUD interface for accessing the data records; a resolution mapping layer that stores a set of entities generated by a many-to-one mapping of data records to entities using entity resolution; and an entities layer that stores resolved entities which may be accessed via either a search interface based on search criteria or a hybrid search interface that supports "get via record id" queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
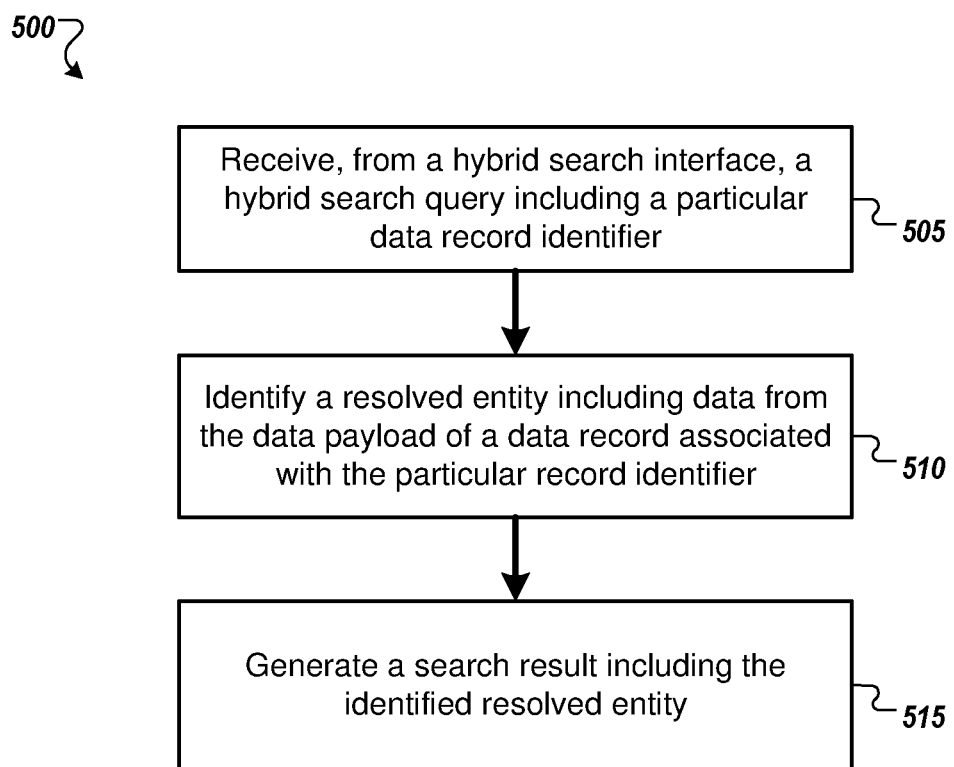
Figure 6:
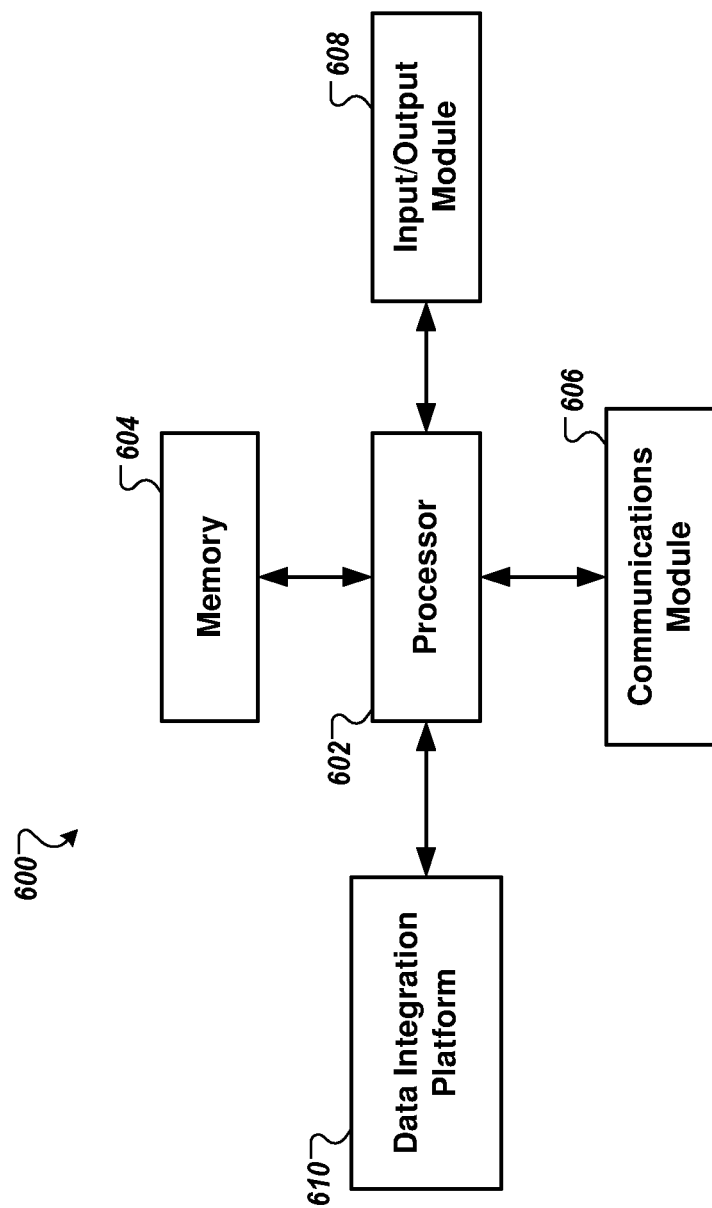

FIG. 5 is a flow diagram of an example method 500 for generating a search result in response to receiving a search query from a hybrid search interface in accordance with some embodiments discussed herein; and FIG. 6 illustrates a schematic block diagram of circuitry that can be included in a computing device, such as a data integration platform, in accordance with some embodiments discussed herein.

DETAILED DESCRIPTION

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the terms "promotion," "offer," "deal" and similar terms may be used interchangeably to refer, without limitation, to any type of offered, presented or otherwise indicated reward, discount, coupon, credit, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

Data continuously collected from multiple sources and describing attributes of merchants associated with and promotions (deals) offered by a promotion and marketing service are an example of stored data that must support multiple types of data access clients. In embodiments, these types of data access clients may be grouped into two general categories: consumers and creators. Consumers (e.g., data analysis groups, lead generation teams) are clients that need to read the highest quality data possible from a data integration system. A data integration system may generate resolved data entities representing the maximum data quality by combining the data from as many different data sources as possible, selecting the highest quality sources of data to show and ensuring the maximum breadth, depth, and accuracy of the data being accessed. Creators may create data that they intend on exposing publicly, e.g., listings or pages on a website, and thus need control over the data they create. Specifically, such clients likely prefer CRUD (creating, reading, updating, and deleting) semantics for accessing their data records.

Providing support for the needs of one of the client categories interferes with providing support for the needs of the other client category. For example, an interface providing consumers with access to resolved entities that represent de-duplicated data from many sources will not enable creators to access the specific data that they have created. Conversely, a CRUD interface that provides creators with control over content and joining of records (i.e., entity resolution) may result in consumers accessing resolved entities that contain incorrect data or even correct data that the creator did not expect. Additionally, in some embodiments, there may be "hybrid" clients who, like creators, benefit from CRUD-like ownership of their data, but who also would benefit from accessing enriched and resolved entities that include their data. One example of a hybrid client for accessing the data of a promotion and marketing service may be a deal producer who needs guaranteed update-ability of their place data but who also may need access to overall customer ratings for a particular place.

Because of the conflicting client data access requirements, a data integration system that provides an entity access interface typically is implemented as a separate system from a system providing a CRUD interface. In a typical example, data records may be extracted from a database providing a CRUD interface for accessing those records, and a separate data integration system providing a resolved entities interface for accessing entities may generate those entities by performing entity resolution on the extracted data records. There are many problems associated with the implementation of separate systems. For example, such implementations do not scale because of the resource costs involved in supporting the multiple systems. Additionally, there may be synchronization problems that arise because the data are duplicated and then handled separated by each of the systems. These synchronization problems are compounded when the stored data are dynamic data continuously received from multiple data sources, e.g., the data stored by a promotion and marketing service.

As such, and according to some example embodiments, the systems and computer program products described herein are therefore configured to implement a single data integration platform that supports multiple data access interfaces to a single corpus of stored dynamic data collected from multiple data sources. In embodiments, the data integration platform includes a record tables layer that stores a group of data records and supports a CRUD interface for accessing the data records; a resolution mapping layer that stores a set of entities generated by a many-to-one mapping of data records to entities using entity resolution; and an entities layer that stores resolved entities which may be accessed via either a search interface based on search criteria or a hybrid search interface that supports "get via record id" queries. In some embodiments, the hybrid search interface may additionally support queries that supply a particular creator's view of the data records.

In embodiments, the data integration platform may be configured to enable a client choice of data access based on the needs of the particular type of client. For example, a creator using the CRUD interface is provided with control over the data owned by the creator, and a consumer using the search interface is provided with a means to search and discover cleaned, resolved data entities that have attributes matching the consumer's search criteria. The hybrid search interface provides hybrid clients with a means to access cleaned, resolved data entities that include their data.

Figure 1:
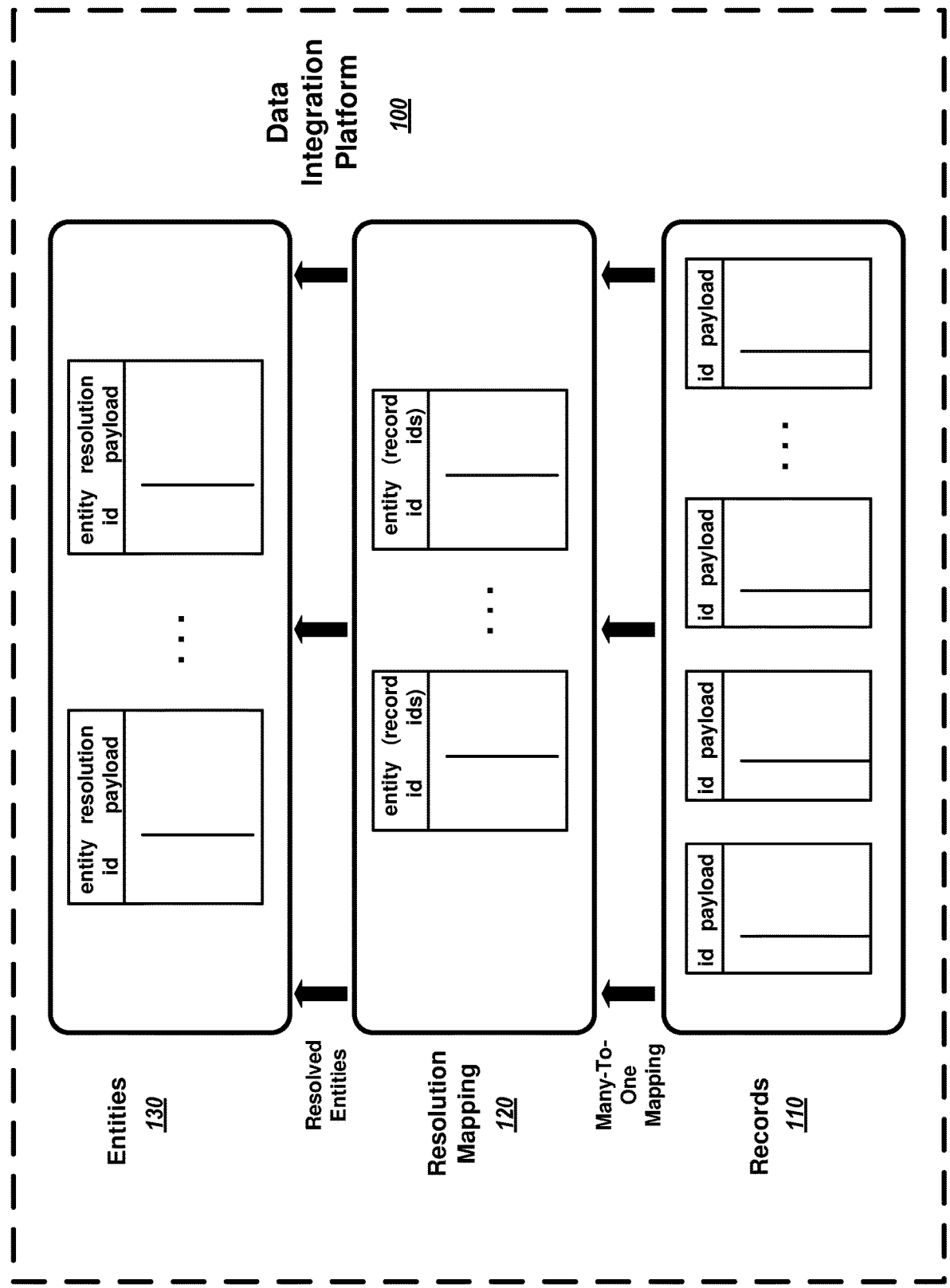
FIG. 1 illustrates an exemplary data integration platform 100 that can be configured to implement multiple data access interfaces to a single corpus of stored dynamic data collected from multiple data sources in accordance with some embodiments discussed herein.

FIG. 1 illustrates an exemplary data integration platform 100 that can be configured to implement multiple data access interfaces to a single corpus of stored dynamic data collected from multiple data sources. In embodiments, data integration platform 100 comprises a records layer 110 for storing a group of data records; a resolution mapping layer 120 for generating a group of entity records using the group of data records using entity resolution; and an entities layer 130 that stores resolved data entities derived from the entity records.

Figure 2:
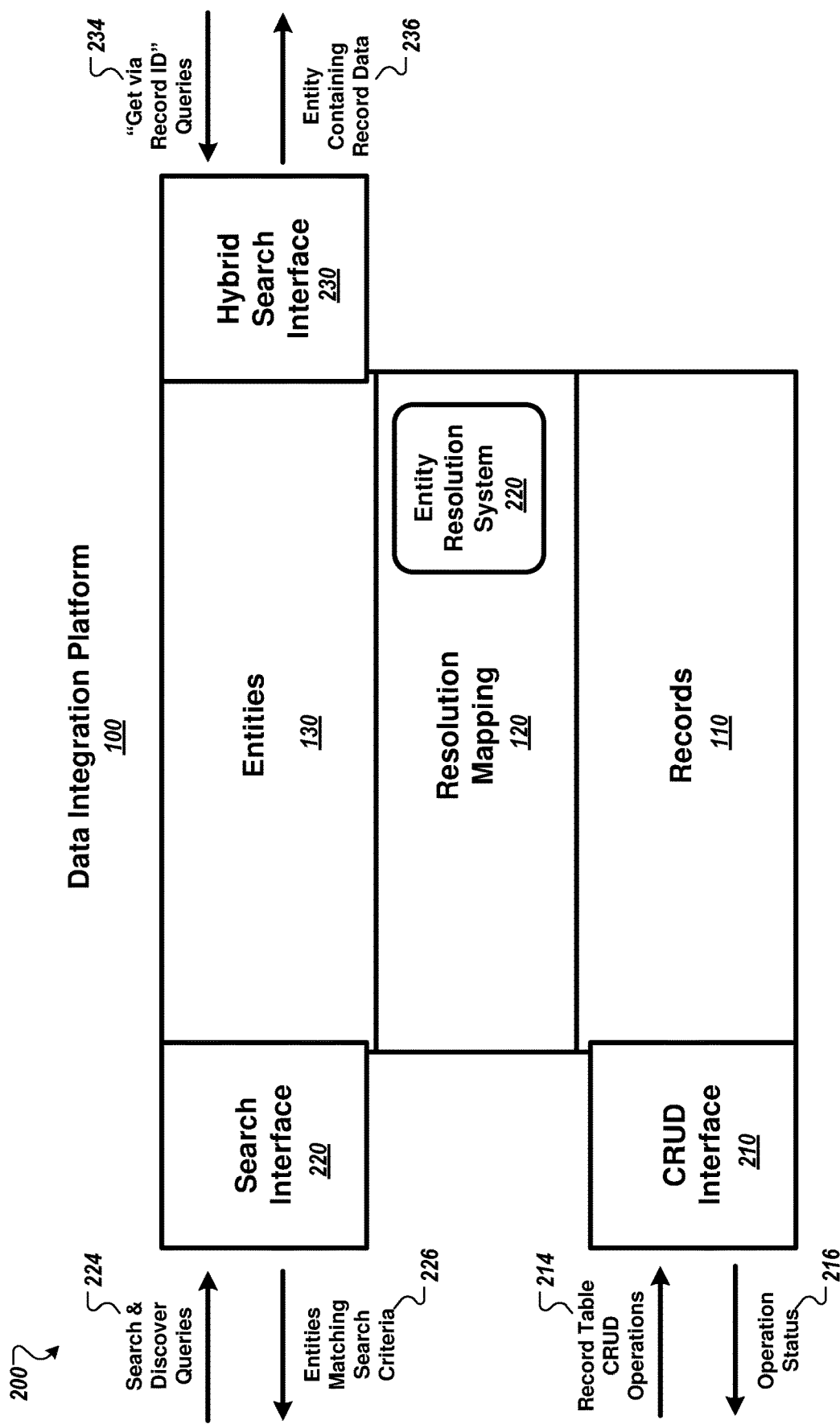
FIG. 2 illustrates an exemplary set of data access interfaces to a single corpus of stored data that are implemented by an exemplary data integration platform in accordance with some embodiments discussed herein.

FIG. 2 illustrates an exemplary set of data access interfaces to a single corpus of stored data that are implemented by an exemplary data integration platform 100. In embodiments, the set of data access interfaces includes a CRUD interface 210 provided by the records layer 110 for enabling data access using CRUD semantics 214 to a group of stored data records; and two interfaces provided by an entities layer 130: a search interface 220 for enabling search and discover queries 224 to be applied to a group of resolved entities generated by the resolution mapping layer 120; and a hybrid search interface 320 for enabling "get via record ID" queries 234 to be applied to the group of resolved entities generated by the resolution mapping layer 120.

In some embodiments, the search interface 220 may be implemented to include a search engine, which in some embodiments, may be an integrated third party search engine (e.g., Elasticsearch). The choice of whether to integrate a search engine into the search interface 220 is an implementation design choice and thus is not critical to the invention.

In embodiments, each of the group of data records in the records layer 110 includes a permanent identifier (record id) and a data payload. In some embodiments, the data records are stored in tables, as depicted in exemplary records layer 110 of FIG. 1. The exemplary choice of storage design is illustrated for clarity and not for limitation of the invention.

In embodiments, the records layer 110 supports a CRUD interface that returns the record id of each record created by a client, and then enables the client to perform any of a set of basic persistence operations (i.e., operations having CRUD semantics) on that record based on receiving its record id in each request to the CRUD interface that is submitted by the client.

In embodiments, data entities are generated via entity resolution in a resolution mapping layer 120 from the group of data records stored in the records layer 110. Each generated entity includes an identifier (entity id) and a set of record ids representing the subset of the data records that have been mapped into the entity. In some embodiments, the generated entities are stored in entity tables, as depicted in exemplary resolution mapping layer 120 of FIG. 1. The exemplary choice of storage design is illustrated for clarity and not for limitation of the invention.

In some embodiments, entity resolution may be preceded by a data cleaning process, and may include one or a combination of data enrichment processes (e.g., normalization and de-duplication). In some embodiments, entity resolution may include automatic cleaning of the data entities as described, for example, in U.S. Provisional Patent Application No. 62/135,005 filed Mar. 18, 2015, entitled "Automatic Entity Resolution Data Cleaning," and included herein in its entirety.

In some embodiments, entity resolution may be implemented by an entity resolution system 220 that may be deployed as a component of the resolution mapping layer 120. Alternatively, in some embodiments, entity resolution system 220 may be deployed as a component separate from the resolution mapping layer 120. The choice of deployment of the entity resolution system 220 is an implementation design choice and thus is not critical to the invention.

In some embodiments in which the data records store dynamic data being collected continuously, entity resolution may be executed repeatedly as the data are being collected or, additionally and/or alternatively, according to a regular schedule (e.g., nightly or weekly) to ensure that the generated entities reflect a current state of the data in the record payloads. In some embodiments, entity resolution may be executed as an offline process. Additionally or alternatively, in some embodiments, entity resolution may be executed in response to notification of a trigger event, which is described in detail with reference to FIG. 3.

In some embodiments, the data integration system 100 stores a history representing the entity resolution process that was executed to generate the current resolved entities. This history (e.g., a log or a state table) may be used to re-create the resolved entities in the event of a system crash or system rollback.

Figure 3:
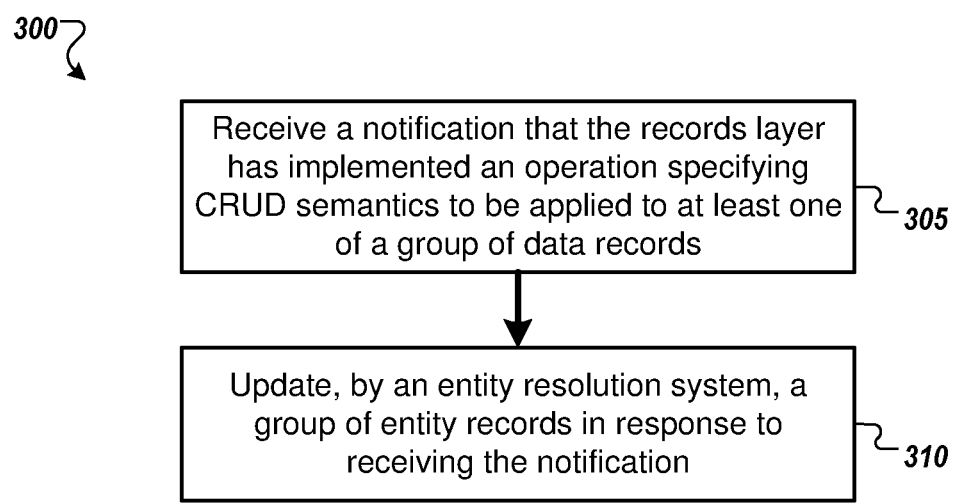
FIG. 3 is a flow diagram of an example method for updating a group of entity records by an entity resolution system in response to a trigger in accordance with some embodiments discussed herein.

FIG. 3 is a flow diagram of an example method 300 for updating a group of entity records by an entity resolution system in response to a trigger. For convenience, the method 300 will be described with respect to a system that includes one or more computing devices and performs the method 300. Specifically, the method 300 will be described with respect to entity resolution being performed by resolution mapping layer 120.

In embodiments, the system receives 305 a notification that a trigger event has occurred. In some embodiments, a trigger event may be a successful implementation of one or a combination of CRUD operations on at least a subset of the group of data records stored in the records layer 110.

In embodiments, the system updates 310, the group of entity records via entity resolution in response to receiving the notification.

In some embodiments, updating a group of entity records may include generating additional entities by revising the current set of many-to-one mappings between the data records and the entities. In some embodiments, revising the many-to-one mappings may include one or a combination of merging and splitting existing entities.

In some embodiments, the entity ids are not permanent identifiers like the record ids because the many-to-one mappings may be revised during entity resolution. If the mapping revisions were limited to only merging existing entities, the existing entity ids could be persistent because they all could be assigned to the new merged entity. For example, a new entity formed by the merging of existing entities may be assigned an entity id that is the combination of the original ids of the merged entities. However, when an existing entity is split to form two or more new split entities, all but one of the split entities must be assigned new ids. In some embodiments, the assignment of new ids to split entities is according to a system policy. For example, in some embodiments, the original entity id is assigned to a split entity that is determined (according to a heuristic) to be the split entity that is the most representative of the original entity, and new entity ids are created for the rest of the split entities. In some embodiments, creation of new entity ids may include further data synchronization.

Turning to FIGS. 1-2, in embodiments, the entities layer 130 includes the most current group of resolved entity records that have been generated by the resolution mapping layer 130. In embodiments, each of the resolved entity records includes an identifier (entity id) and a resolution payload including data from each of the data records that were mapped to the entity. In some embodiments, the resolved entity records are stored in resolved entity tables, as depicted in exemplary entities layer 130 of FIG. 1. The exemplary choice of storage design is illustrated for clarity and not for limitation of the invention.

As described with reference to FIG. 2, in embodiments, the entities layer 130 supports two different data access interfaces through which clients may access the resolved entity data: a search interface 220 and a hybrid search interface 230. Each of the interfaces supports a different semantics for accessing the resolved entity records.

Figure 4:
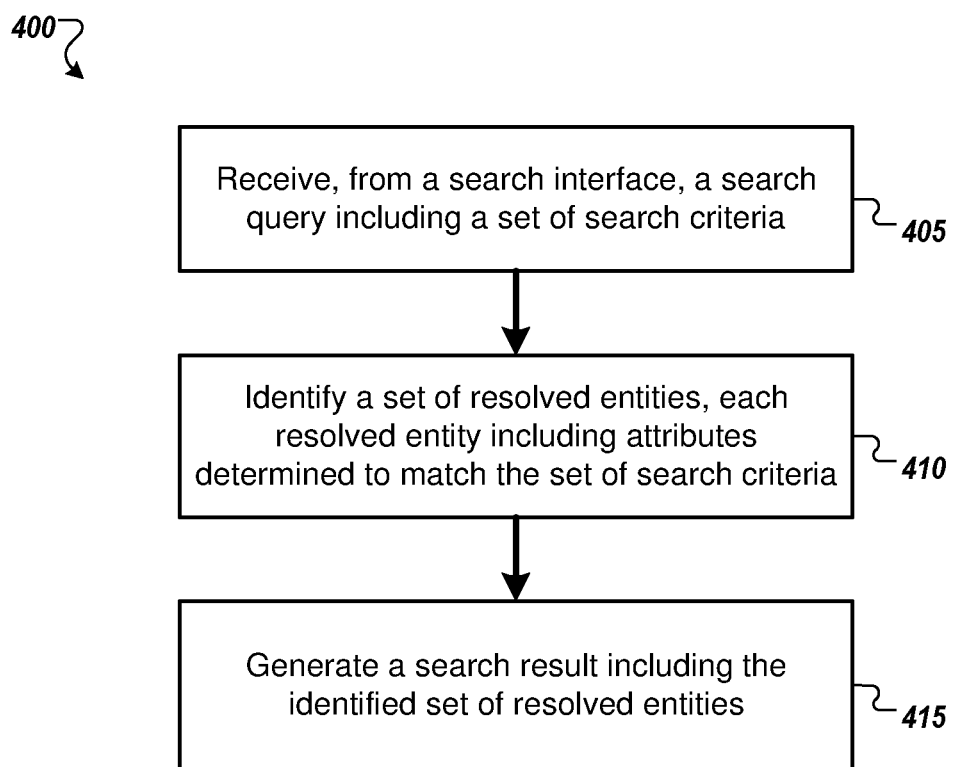
FIG. 4 is a flow diagram of an example method for generating a search result in response to receiving a search query from a search interface in accordance with some embodiments discussed herein.

FIG. 4 is a flow diagram of an example method 400 for generating a search result in response to receiving a search query from a search interface 220. For convenience, the method 400 will be described with respect to a system that includes one or more computing devices and performs the method 400. Specifically, the method 400 will be described with respect to generating a search result by entities layer 130 of data integration platform 100.

In embodiments, the system receives 405, from the search interface, a search query 224 that includes a set of search criteria.

The following exemplary use case scenario, described for illustration and not limitation, illustrates a client's use of the search interface. Assume that the resolved data entities in the entities layer 130 describe attributes of businesses that provide deals offered by a promotion and marketing service. One of those businesses is a restaurant called "Joe's Pizza Place." A consumer, searching for local restaurants, may submit a query to the search interface "GET entities where <location>=<local ZIP code>."

In embodiments, the system identifies 410 a set of resolved entities, each including attributes determined to match the set of search criteria. Referring to the use case scenario, the resolved entity including the name of "Joe's Pizza Place" will be included in the identified set of entities if the location attribute (i.e., ZIP code) of the entity matches the <local ZIP code> value.

In embodiments, the system generates 415 a search result 226 including the identified set of resolved entities.

FIG. 5 is a flow diagram of an example method 500 for generating a search result in response to receiving a search query from a hybrid search interface 230. For convenience, the method 500 will be described with respect to a system that includes one or more computing devices and performs the method 500. Specifically, the method 500 will be described with respect to generating a search result by entities layer 130 of data integration platform 100.

In embodiments, the system receives 505, from the hybrid search interface, a search query 234 that includes a particular record identifier.

The following exemplary use case scenario, described for illustration and not limitation, illustrates a client's use of the hybrid search interface. Referring to the previously described business entity "Joe's Pizza Place," assume that the entity also includes a telephone number, and the business owner wants to offer a deal only to walk-in customers through the promotion and marketing service. Thus, the business owner does not want the restaurant telephone number to be included in information about the restaurant. The business owner then creates, through the CRUD interface supported by the records layer 110, a new updated data record for the business that does not contain the telephone number. The updated record is given the identifier "123." The update triggers a new set of resolved entities to be generated by the resolution mapping layer 120. A deal producer generating the deal now submits a query to the hybrid search interface "GET entity for record id 123."

In embodiments, the system identifies 510 a resolved entity that includes data from the data payload of the data record having the particular record identifier (e.g., "123"), and generates 515 a search result 236 including the identified resolved entity.

As previously described with reference to FIG. 3, entity resolution may include revising the mappings between the data records and the entities, and the revising (which may include merging and/or splitting of existing entities) may result in a change in the entity id associated with a particular record id. The "GET via Record ID" query 234 enables a client to retrieve the current resolved entity to which a particular record is mapped.

Referring to the exemplary use case, the search result returned to the deal producer in response to the query "GET entity for record id 123" will return an entity with all the business information for "Joe's Pizza Place" except for the telephone number.

FIG. 6 shows a schematic block diagram of circuitry 600, some or all of which may be included in, for example, data integration platform 100. As illustrated in FIG. 6, in accordance with some example embodiments, circuitry 600 can include various means, such as processor 602, memory 604, communications module 606, and/or input/output module 608. As referred to herein, "module" includes hardware, software and/or firmware configured to perform one or more particular functions. In this regard, the means of circuitry 600 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 604) that is executable by a suitably configured processing device (e.g., processor 602), or some combination thereof.

Processor 602 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments processor 602 comprises a plurality of processors. The plurality of processors may be embodied on a single computing device or may be distributed across a plurality of computing devices collectively configured to function as circuitry 600. The plurality of processors may be in operative communication with each other and may be collectively configured to perform one or more functionalities of circuitry 600 as described herein. In an example embodiment, processor 602 is configured to execute instructions stored in memory 604 or otherwise accessible to processor 602. These instructions, when executed by processor 602, may cause circuitry 600 to perform one or more of the functionalities of circuitry 600 as described herein.

Whether configured by hardware, firmware/software methods, or by a combination thereof, processor 602 may comprise an entity capable of performing operations according to embodiments of the present invention while configured accordingly. Thus, for example, when processor 602 is embodied as an ASIC, FPGA or the like, processor 602 may comprise specifically configured hardware for conducting one or more operations described herein. Alternatively, as another example, when processor 602 is embodied as an executor of instructions, such as may be stored in memory 604, the instructions may specifically configure processor 602 to perform one or more algorithms and operations described herein, such as those discussed in connection with FIGS. 1-5.

Memory 604 may comprise, for example, volatile memory, non-volatile memory, or some combination thereof. Although illustrated in FIG. 6 as a single memory, memory 604 may comprise a plurality of memory components. The plurality of memory components may be embodied on a single computing device or distributed across a plurality of computing devices. In various embodiments, memory 604 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 604 may be configured to store information, data (including analytics data), applications, instructions, or the like for enabling circuitry 600 to carry out various functions in accordance with example embodiments of the present invention. For example, in at least some embodiments, memory 604 is configured to buffer input data for processing by processor 602. Additionally or alternatively, in at least some embodiments, memory 604 is configured to store program instructions for execution by processor 602. Memory 604 may store information in the form of static and/or dynamic information. This stored information may be stored and/or used by circuitry 600 during the course of performing its functionalities.

Communications module 606 may be embodied as any device or means embodied in circuitry, hardware, a computer program product comprising computer readable program instructions stored on a computer readable medium (e.g., memory 604) and executed by a processing device (e.g., processor 602), or a combination thereof that is configured to receive and/or transmit data from/to another device, such as, for example, a second circuitry 600 and/or the like. In some embodiments, communications module 606 (like other components discussed herein) can be at least partially embodied as or otherwise controlled by processor 602. In this regard, communications module 606 may be in communication with processor 602, such as via a bus. Communications module 606 may include, for example, an antenna, a transmitter, a receiver, a transceiver, network interface card and/or supporting hardware and/or firmware/software for enabling communications with another computing device.

Communications module 606 may be configured to receive and/or transmit any data that may be stored by memory 604 using any protocol that may be used for communications between computing devices. Communications module 606 may additionally or alternatively be in communication with the memory 604, input/output module 608 and/or any other component of circuitry 600, such as via a bus.

Input/output module 608 may be in communication with processor 602 to receive an indication of a user input and/or to provide an audible, visual, mechanical, or other output to a user. Some example visual outputs that may be provided to a user by circuitry 600 are discussed in connection with FIGS. 1-2. As such, input/output module 608 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 600 is embodied as a server or database, aspects of input/output module 608 may be reduced as compared to embodiments where circuitry 600 is implemented as an end-user machine or other type of device designed for complex user interactions. In some embodiments (like other components discussed herein), input/output module 608 may even be eliminated from circuitry 600. Alternatively, such as in embodiments wherein circuitry 600 is embodied as a server or database, at least some aspects of input/output module 608 may be embodied on an apparatus used by a user that is in communication with circuitry 600. Input/output module 608 may be in communication with the memory 604, communications module 606, and/or any other component (s), such as via a bus. Although more than one input/output module and/or other component can be included in circuitry 600, only one is shown in FIG. 6 to avoid overcomplicating the drawing (like the other components discussed herein).

Data integration platform 610 may also or instead be included and configured to perform the functionality discussed herein related to the data integration discussed above. In some embodiments, some or all of the functionality of data integration may be performed by processor 602. In this regard, the example processes and algorithms discussed herein can be performed by at least one processor 602 and/or data integration platform 610. For example, non-transitory computer readable media can be configured to store firmware, one or more application programs, and/or other software, which include instructions and other computer-readable program code portions that can be executed to control each processor (e.g., processor 602 and/or data integration platform 610) of the components of system 100 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of data integration platform 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 602 and/or data integration platform 610 discussed above with reference to FIG. 6, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 604) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising one or more computers and one or more storage devices, the system comprising:
    a single corpus of stored dynamic data; and
    a data integration platform for accessing the single corpus of stored dynamic data via a plurality of data access interfaces, wherein the data integration platform comprises:
    a records layer for storing a group of data records from the stored dynamic data;
    a resolution mapping layer for generating a group of entity records using the group of data records from the stored dynamic data;
    an entities layer for storing a group of resolved data entities derived from the group of entity records, wherein each resolved data entity includes a resolved data entity identifier and a resolution payload that includes data from the data payload of at least one of the data records; and
    a hybrid search interface implemented by the entities layer, wherein, in response to a first search query including a particular record identifier received from the hybrid search interface, the entities layer generates a first search result including a resolved data entity associated with the particular record identifier, and
    wherein, in response to a second search query including a set of search criteria, the entities layer generates a second search result including a set of the resolved data entities, each resolved data entity of the set of resolved data entities including attributes determined to match the set of search criteria.

2. The system of claim 1, wherein the records layer implements a creating, reading, updating, and deleting (CRUD) interface for accessing the data records.

3. The system of claim 2, wherein the records layer implements an operation specifying CRUD semantics to be applied to at least one of the data records in response to receiving a request from the CRUD interface.

4. The system of claim 3, wherein each entity record includes an entity identifier and a set of record identifiers representing a set of the data records that have been determined, using an entity resolution system, to represent a unique entity.

5. The system of claim 4, wherein the group of entity records is updated by the entity resolution system in response to a notification of the implementation of the operation specifying CRUD semantics by the records layer.

6. The system of claim 1, wherein generating the group of entity records using the group of data records comprises data quality operations including at least one of de-duplication, enrichment, and normalization of the group of data records.

7. The system of claim 1, wherein the first search result comprises data from a data payload of a data record associated with the particular record identifier.

8. The system of claim 1, wherein the hybrid search interface includes a search engine.

9. A computer program product, stored on a non-transitory computer readable medium, comprising instructions that when executed on one or more computers cause the one or more computers to perform operations implementing a data integration platform comprising:
    a single corpus of stored dynamic data; and
    a records layer for storing a group of data records from the stored dynamic data;
    a data integration platform for accessing the single corpus of stored dynamic data via a plurality of data access interfaces, wherein the data integration platform comprises:
    a resolution mapping layer for generating a group of entity records using the group of data records from the stored dynamic data;
    an entities layer for storing a group of resolved data entities derived from the group of entity records, wherein each resolved data entity includes a resolved data entity identifier and a resolution payload that includes data from the data payload of at least one of the data records; and a hybrid search interface implemented by the entities layer, wherein, in response to a first search query including a particular record identifier received from the hybrid search interface, the entities layer generates a first search result including a resolved data entity associated with the particular record identifier, and wherein, in response to a second search query including a set of search criteria, the entities layer generates a second search result including a set of the resolved data entities, each resolved data entity of the set of resolved data entities including attributes determined to match the set of search criteria.

10. The computer program product of claim 9, wherein the records layer implements a creating, reading, updating, and deleting (CRUD) interface for accessing the data records.

11. The computer program product of claim 10, wherein the records layer implements an operation specifying CRUD semantics to be applied to at least one of the data records in response to receiving a request from the CRUD interface.

12. The computer program product of claim 11, wherein each entity record includes an entity identifier and a set of record identifiers representing a set of the data records that have been determined, using an entity resolution system, to represent a unique entity.

13. The computer program product of claim 12, wherein the group of entity records is updated by the entity resolution system in response to a notification of the implementation of the operation specifying CRUD semantics by the records layer.

14. The computer program product of claim 9, wherein generating the group of entity records using the group of data records comprises data quality operations including at least one of de-duplication, enrichment, and normalization of the group of data records.

15. The computer program product of claim 9, wherein the first search result comprises data from a data payload of a data record associated with the particular record identifier.

16. The computer program product of claim 9, wherein the hybrid search interface includes a search engine.

* * * * *